United States Patent
Shaffer et al.

(10) Patent No.: US 9,079,990 B2
(45) Date of Patent: Jul. 14, 2015

(54) METHODS OF PRODUCTION OF ALKYLSTYRENE/ISOOLEFIN POLYMERS

(75) Inventors: Timothy D. Shaffer, Hackettstown, NJ (US); Deborah J. Davis, Pasadena, TX (US); James P. Stokes, Katy, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 505 days.

(21) Appl. No.: 12/791,520

(22) Filed: Jun. 1, 2010

(65) Prior Publication Data

US 2011/0294924 A1 Dec. 1, 2011

(51) Int. Cl.
C08F 12/12 (2006.01)
C08F 4/12 (2006.01)
C08F 4/14 (2006.01)
C08F 4/52 (2006.01)
C08F 210/14 (2006.01)
C08F 210/10 (2006.01)
C08F 212/12 (2006.01)

(52) U.S. Cl.
CPC ............. C08F 210/14 (2013.01); C08F 210/10 (2013.01); C08F 212/12 (2013.01)

(58) Field of Classification Search
USPC ..................................................... 526/89, 92
See application file for complete search history.

(56) References Cited

U.S. PATENT DOCUMENTS

| 5,426,167 | A | 6/1995 | Powers et al. |
| 6,444,768 | B1 | 9/2002 | Webb et al. |
| 6,939,933 | B2 | 9/2005 | Webb et al. |
| 7,402,636 | B1 | 7/2008 | Shaffer et al. |
| 7,425,601 | B2 | 9/2008 | Chung et al. |
| 7,781,547 | B2 * | 8/2010 | Chen et al. ............... 526/88 |
| 2004/0059076 | A1 | 3/2004 | Webb et al. |
| 2008/0103272 | A1 * | 5/2008 | Chen et al. ............... 526/135 |

FOREIGN PATENT DOCUMENTS

| WO | WO 2004/058828 | 7/2004 |
| WO | WO 2004/058836 | 7/2004 |
| WO | WO 2004/067577 | 8/2004 |
| WO | WO 2006/011868 | 2/2006 |

* cited by examiner

*Primary Examiner* — Jeffrey Mullis
(74) *Attorney, Agent, or Firm* — Nancy T Krawczyk

(57) ABSTRACT

Copolymer are formed by polymerizing $C_4$ to $C_7$ isoolefin monomers and alkyl-styrene monomers. The method comprises first providing feed streams into a reactor. The various feed streams provide monomers, a polar diluent or polar diluent mixture, and a catalyst system into the reactor. In the reactor, the feed streams contact one another so that the monomers form a polymer in a stable slurry, wherein the amount of polymer in the slurry yields a slurry concentration greater than 22 wt %. The ratio of moles of polymer formed per mole initiator is in the range of 0.25 to 4.0 moles polymer per mole of initiator.

13 Claims, No Drawings

US 9,079,990 B2

METHODS OF PRODUCTION OF ALKYLSTYRENE/ISOOLEFIN POLYMERS

FIELD OF THE INVENTION

The invention relates to a new catalyst system that improves the heat transfer capability of a styrene/isoolefin copolymer reactor slurry process system in the production of random copolymers of one or more isoolefin monomers and styrene in continuous slurry polymerization processes.

BACKGROUND

Isobutylene-isoprene polymers have been well known since the 1930s. They have good impermeability to air and a high level of damping when stretched or compressed. These polymers are used extensively throughout the tire and pharmaceutical industries. The copolymers are made by a cationic slurry polymerization process at approximately −95° C. using a catalyst comprising a Lewis Acid and an initiator. Lewis Acids such as the aluminum alkyls and aluminum chloride are used extensively in both laboratory experiments and commercial scale production. Initiators such as water and anhydrous HCl are used extensively.

Industry has generally accepted widespread use of a slurry polymerization process to produce butyl rubber, polyisobutylene, and other similar polymers in a diluent that dissolves the monomers and catalysts but not the polymer product. For manufacturing traditional butyl rubbers, i.e., isobutylene-isoprene copolymers, the slurry polymerization process offers a number of other advantages such as an achievable polymer concentration of approximately 26% to 37% by volume in the reaction mixture, as opposed to the concentration of only about 8% to 12% in solution polymerization. An acceptable relatively low viscosity of the polymerization mass is obtained enabling the heat of polymerization to be removed more effectively by surface heat exchange. Potential challenges associated with slurry polymerization are discussed in U.S. Pat. No. 6,939,933.

Isobutylene-para-methylstyrene (IPMS) polymers are also known. They are made in a similar process to isobutylene-isoprene polymers using similar initiation systems and are also used in the tire and pharmaceutical industries. However, there are a number of difficulties with IPMS polymerization, as compared to isobutylene-isoprene copolymerization, and these difficulties are exacerbated when using higher levels of para-methylstyrene (PMS) co-monomer. These difficulties include: instability of reaction temperatures and flash gas (reactor liquid composition); instability of Mooney viscosity control; lower than desirable conversion of monomer to product; higher than desirable warm-up rates due to rubber fouling, particularly around the reactor circulation pump; lower than desirable operability limitation on slurry concentrations; shorter reactor run lengths under comparable conditions; higher slurry viscosity under comparable conditions; and poorer and more erratic response of reactor to control parameters. Because of these difficulties it has historically been much more difficult and costly to produce IPMS copolymers than conventional isobutylene-isoprene copolymers. Currently, these undesirable process characteristics are managed by limiting throughput, PMS content, or a combination of the two.

Commercially, the production of IPMS copolymers is limited to slurry concentration of about 20 wt % polymer. This value is substantially lower than that observed for traditional isobutylene-isoprene copolymers, which can be operated at the above noted 26 to 37 wt %. The operating limits of IPMS polymerizations appear to stem from high slurry viscosity and the resulting poor heat transfer. Additionally, mass fouling is often experienced during initial polymerization. Methods to improve the concentration and stability of IPMS slurries could increase reactor productivity and decrease the cost of producing such polymers.

SUMMARY OF THE INVENTION

The present invention is directed to a method of producing a polymer derived from at least one isoolefin and alkyl-styrene wherein the slurry polymerization of the polymer occurs under conditions such that the slurry generated in the reactor is a stable slurry so that the slurry concentration may be increased and yield an improvement in production and capacity of the resulting polymer.

Thus, disclosed herein is a polymerization method for preparing polymers derived from $C_4$ to $C_7$ isoolefin monomers and alkyl-styrene monomers. The method comprises first providing feed streams into a reactor. The various feed streams provide monomers, a polar diluent or polar diluent mixture, and a catalyst system into the reactor. In the reactor, the feed streams contact one another so that the monomers form a polymer in a slurry, wherein the amount of polymer in the slurry yields a slurry concentration greater than 22 wt %. The slurry is preferably a stable slurry defined as a slurry that is a stirable, free flowing fluid, contrary to a highly viscous and difficult to stir fluid.

In one aspect of the disclosed invention, the catalyst system feed into the reactor is comprised of a Lewis acid and an initiator. The Lewis acid may be a Group 13 Lewis acid having the formula $R_nMX_{3-n}$, wherein M is a Group 13 metal, R is a monovalent hydrocarbon radical selected from the group consisting of $C_1$ to $C_{12}$ alkyl, aryl, arylalkyl, alkylaryl and cycloalkyl radicals; and n is an integer from 0 to 3; and X is a halogen independently selected from the group consisting of fluorine, chlorine, bromine, and iodine. Alternatively, the Lewis acid may be selected from the group consisting of ethyl aluminum sesquichloride, aluminum bromide, boron trichloride, diethylaluminum chloride, dimethylaluminum chloride, and diisobutylaluminum chloride, and mixtures thereof.

In another aspect of the invention, an oxygenate or ion containing species may also be feed into the reactor. The oxygenate may be provided in the catalyst feed stream, the monomer feed stream, or separately injected into the reactor. In one aspect, the oxygenate is an alcohol or an ester.

In one disclosed aspect of the invention, the isoolefin monomer to be polymerized is isobutylene, isobutene, 2-methyl-1-butene, 3-methyl-1-butene, 2-methyl-2-butene, 1-butene, 2-butene, methyl vinyl ether, indene, vinyltrimethylsilane, hexene, or 4-methyl-1-pentene. In another aspect, the alkyl-styrene is derived from a $C_1$ to $C_7$ alkyl. In yet another aspect, an additional monomer, such as a $C_4$ to $C_{14}$ multiolefin, is also added to the reactor to form a terpolymer.

Also disclosed herein is a polymerization method for preparing polymers derived from $C_4$ to $C_7$ isoolefin monomers and alkyl-styrene monomers wherein the ratio of moles of polymer formed per mole initiator in the range of 0.25 to 3.0 moles polymer per mole of initiator. The method comprises first providing feed streams into a reactor. The various feed streams provide monomers, a polar diluent or polar diluent mixture, and a catalyst system comprising a Lewis acid and an initiator into the reactor. In the reactor, the feed streams contact one another so that the monomers form a polymer in a slurry.

Also disclosed herein is an isoolefin-alkylstyrene polymer manufactured by either of the above discussed methods. The polymer may also contain $C_4$ to $C_{14}$ multiolefin derived units. The polymer may be further halogenated or otherwise functionalized. The polymer, or the functionalized derivative thereof, may be blended with a variety of components to yield either an elastomeric composition or an thermoplastic elastomeric composition. Such additional components include, but are not limited to: a) at least one filler selected from calcium carbonate, clay, mica, silica, silicates, talc, titanium dioxide, starch, wood flour, carbon black, or mixtures thereof b) at least one inorganic nanoclay or organic nanoclay; c) at least one processing oil; d) at least one processing aid selected from plastomer, polybutene, polyalphaolefin oils, or mixtures thereof e) at least one curative; f) a secondary elastomer; g) a thermoplastic resin; or h) any combination of a-g.

The disclosed polymer may be used in any composition that is then used directly as, or as a component therein, a tire innerliner, a tire bladder, a curing bladder, a hose, a conveyor belt, or a pharmaceutical stopper.

DETAILED DESCRIPTION OF THE INVENTION

The invention concerns a catalyst system and process for production of polymers containing a para-alkylstyrene derived monomer. An improved catalyst system and process has been discovered which affords many unexpected advantages for commercial slurry polymerization of isoolefin-alkylstyrene copolymers generally, and in particular isoolefin-para-alkylstyrene (IPAS) copolymers. This new catalyst system includes a Lewis acid as described later in more detail.

Various specific embodiments, versions, and examples of the invention will now be described, including preferred embodiments and definitions that are adopted herein for purposes of understanding the embodiment invention. For determining infringement, the scope of the "invention" will refer to any one or more of the appended embodiments, including their equivalents and elements or limitations that are equivalent to those that are recited.

DEFINITIONS

Definitions applicable to the presently described invention are as described below.

As used herein, the term "catalyst system" refers to and includes any Lewis Acid or other metal complex used to catalyze the polymerization of the olefinic monomers of the invention, as well as the initiator described below, and other minor catalyst components.

"Slurry" refers to a volume of diluent comprising monomers, Lewis acid, initiator, and polymers that have precipitated from the diluent, The "slurry concentration" is the weight percent of these reacted monomers—the weight percent of the reacted monomers by total weight of the slurry, diluent, unreacted monomers, and catalyst system.

"Polymer" may be used to refer to homopolymers, copolymers, interpolymers, terpolymers, etc. Likewise, a copolymer may refer to a polymer comprising at least two monomers, optionally with other monomers.

When a polymer is referred to as comprising a monomer, the monomer is present in the polymer in the polymerized form of the monomer or in the derivative form the monomer. However, for ease of reference the phrase comprising the (respective) monomer or the like is used as shorthand. Likewise, when catalyst components are described as comprising neutral stable forms of the components, it is well understood by one skilled in the art, that the ionic form of the component is the form that reacts with the monomers to produce polymers.

"Isobutylene-based elastomer" or polymer refers to elastomers or polymers comprising at least 70 mol % repeat units from isobutylene.

"Hydrocarbon" refers to molecules or segments of molecules containing primarily hydrogen and carbon atoms. In some embodiments, hydrocarbon also includes halogenated versions of hydrocarbons and versions containing heteroatoms.

"Alkyl" refers to a paraffinic hydrocarbon group which may be derived from an alkane by dropping one or more hydrogens from the formula, such as, for example, a methyl group ($CH_3$), or an ethyl group ($CH_3CH_2$), etc.

"Rubber" refers to any polymer or composition of polymers consistent with the ASTM D1566 definition: "a material that is capable of recovering from large deformations, and can be, or already is, modified to a state in which it is essentially insoluble (but can swell) in boiling solvent . . . ". Elastomer is a term that may be used interchangeably with the term rubber. Elastomeric composition refers to any composition comprising at least one elastomer as defined above.

Monomers

In accordance with the present invention applicants have discovered an improved polymerization system for polymerizing an isoolefin having from 4 to 7 carbon atoms and para-alkylstyrene monomers. In accordance with a preferred embodiment of the invention, the process produces copolymers containing between about 80 and 99.5 wt % isoolefin and between about 0.5 and 20 wt % of the alkylstyrene. In accordance with another embodiment, where glassy or plastic materials are being produced as well, the copolymers comprise between about 10 and 99.5 wt % of the isoolefin and about 0.5 and 90 wt % of the alkylstyrene.

The isoolefin is a $C_4$ to $C_7$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. In some embodiments, a secondary olefin may be present, such as a $C_4$ to $C_{14}$ multiolefin. Examples of applicable multiolefins are isoprene, butadiene, 2,3-dimethyl-1,3-butadiene, myrcene, 6,6-dimethyl-fulvene, hexadiene, cyclopentadiene, and piperylene.

The alkylstyrene is a substituted styrene, wherein the substitution is a $C_1$ to $C_7$ alkyl. In another embodiment, the alkyl substitution on the styrene occurs at the ortho, meta, or para position. In one embodiment, the alkylstyrene is a methylstyrene. In another embodiment, the alkylstyrene is para-methylstyrene.

Catalyst System

As already noted, the polymerization of the isoolefin and the alkylstyrene is limited by the much lower slurry concentration in the reactor. It has been unexpectedly discovered that catalyst systems which produce fewer moles of polymer per mole of initiator produce a less viscous slurry by increasing the weight fraction of polymer in the slurry particle and reducing the occluded diluent in the particle. By reducing the amount of occluded diluent in the slurry particles, the volume fraction of the particles in the slurry decreases thereby reducing the slurry viscosity at the same polymer weight fraction in the slurry. Therefore, the polymer weight fraction in the reactor can be increased to return the slurry viscosity to the maximum operable level in the reactor. The overall result is an increase in reactor production and polymer throughput.

The molar amount of polymer produced per mole of initiator in the present invention is not more than 4 moles polymer per mole initiator. Alternatively, the ratio of polymer per initiator is in the range of 0.25 to 4.0 moles polymer/mole initiator. In another embodiment, the system produces 0.25 to 3.0 moles polymer/mole initiator. In another embodiment, the system produces 0.25 to 2.5 moles polymer/mole initiator. In yet another embodiment, the system produces 0.5 to 2.5 moles polymer/mole initiator.

Catalyst systems which produce fewer moles of polymer per mole of initiator are comprised of weaker Lewis acids in combination with initiators. Stronger Lewis acids in combination with an initiator may also be used when oxygenates or ion containing species are added to the polymerization medium. While not wishing to be bound by theory, selecting catalyst components which maximize the ionic character of the slurry are preferred.

Lewis Acids

Desirable catalysts are Lewis Acids based on metals from Group 4, 13 and 15 of the Periodic Table of the Elements, including boron, aluminum, gallium, indium, titanium, zirconium, tin, vanadium, arsenic, antimony, and bismuth. In one embodiment, the metals are aluminum, boron and titanium, with aluminum being desirable. In the practice of the method of this invention, using the weaker Lewis acids leads to less alkylation and branching and higher monomer conversion rates.

The Group 13 Lewis Acids have the general formula $R_nMX_{3-n}$, wherein "M" is a Group 13 metal, R is a monovalent hydrocarbon radical selected from the group consisting of $C_1$ to $C_{12}$ alkyl, aryl, arylalkyl, alkylaryl and cycloalkyl radicals; and n is an integer from 0 to 3; X is a halogen independently selected from the group consisting of fluorine, chlorine, bromine, and iodine, preferably chlorine. The term "arylalkyl" refers to a radical containing both aliphatic and aromatic structures, the radical being at an alkyl position. The term "alkylaryl" refers to a radical containing both aliphatic and aromatic structures, the radical being at an aryl position. Nonlimiting examples of weaker Lewis acids include aluminum bromide, boron trichloride, ethyl aluminum sesquichloride ($Et_{1.5}AlCl_{1.5}$ or EASC), diethylaluminum chloride, dimethylaluminum chloride, and diisobutylaluminum chloride, or mixtures thereof. Nonlimiting examples of stronger Lewis acids includes ethyl aluminum dichloride ($EtAlCl_2$ or EADC) and diethylaluminum chloride or mixtures thereof.

The Group 4 Lewis Acids have the general formula $MX_4$, wherein M is a Group 4 metal and X is a ligand, preferably a halogen. Nonlimiting examples include titanium tetrachloride, zirconium tetrachloride, or tin tetrachloride.

The Group 15 Lewis Acids have the general formula $MX_y$, wherein M is a Group 15 metal, X is a ligand, preferably a halogen, and y is an integer from 3 to 5. Nonlimiting examples include vanadium tetrachloride and antimony pentafluoride.

Initiators

According to one embodiment of the invention, the Lewis Acid catalyst is used in combination with an initiator. The initiator may be those which yield a slow stepwise initiations involving several polar complexes in equilibrium characteristic of the catalyst systems such as water or HCl. Alternatively, the initiators are those capable of being precomplexed in a suitable diluent with the chosen Lewis Acid to yield a complex which is in equilibrium with a carbenium ion pair which rapidly forms a propagating polymer chain in the reactor; such initiators yield a fast, simple initiation of polymerization in the reactor The 'faster' initiators are tertiary halide greater than $C_4$, wherein the initiator has the formula (A):

wherein X is a halogen; $R_1$ is selected from the group consisting of $C_1$ to $C_8$ alkyl, and $C_2$ to $C_8$ alkenyl; $R_3$ is selected from the group consisting of $C_1$ to $C_8$ alkyl, $C_2$ to $C_8$ alkenyl and phenylalkyl; and $R_2$ is selected from the group consisting of $C_4$ to $C_{200}$ alkyl, $C_2$ to $C_8$ alkenyl, phenyl, phenylalkyl, alkylphenyl, $C_3$ to $C_{10}$ cycloalkyl, and

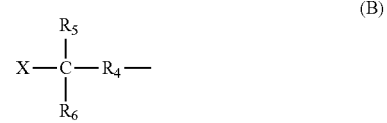

wherein X is a halogen; $R_5$ is selected from the group consisting of $C_1$ to $C_8$ alkyl, and $C_2$ to $C_8$ alkenyl; $R_6$ is selected from the group consisting of $C_1$ to $C_8$ alkyl, $C_2$ to $C_8$ alkenyl and phenylalkyl; and $R_4$ is selected from the group consisting of phenylene, biphenyl, α,ω-diphenylalkane and —$(CH_2)_n$—, wherein n is an integer from 1 to 10; and wherein $R_1$, $R_2$, and $R_3$ can also form adamantyl or bornyl ring systems, the X group being in a tertiary carbon position.

Substitution of the above structural formula radical (B) for $R_2$ in formula (A) results in the following formula (C):

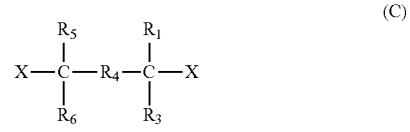

wherein X, $R_1$, $R_3$, $R_4$, $R_5$ and $R_6$ are as defined above. The compounds represented by structural formula (C) contain two dissociable halides and may be considered as merely multiples of those compounds represented by structural formula (A).

Multifunctional initiators are employed where the production of branched copolymers is desired, while mono- and di-functional initiators are preferred for the production of substantially linear copolymers.

In one desirable embodiment of structure (A), the initiator is an oligomer of isobutylene as in structure (D):

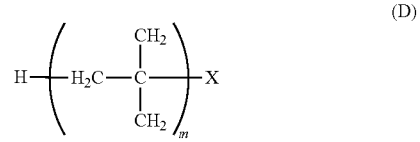

wherein X is a halogen, and the value of m is from 1 to 60, and mixtures thereof. In another embodiment, m is from 2 to 40. This structure is also described as a tertiary alkyl chloride-terminated polyisobutylene having a Mn up to 2500 in one embodiment, and up to 1200 in another embodiment.

Representative initiators, for example, comprise compounds such as 2-acetyl-2-phenylpropane, i.e., cumyl acetate; 2-methoxy-2-phenyl propane, i.e., cumylmethylether; 1,4-di(2-methoxy-2-propyl)benzene, i.e., di(cumylmethyl ether); the cumyl halides, particularly the chlorides, i.e., 2-chloro-2-phenylpropane, i.e., cumyl chloride (1-chloro-1-methylethyl)benzene; 1,4-di(2-chloro-2-propyl)benzene, i.e., di(cumylchloride); 1,3,5-tri(2-chloro-2-propyl)benzene, i.e., tri(cumylchloride); the aliphatic halides, particularly the chlorides, i.e., 2-chloro-2,4,4-trimethylpentane (TMPCl), 2-bromo-2,4,4-trimethylpentane (TMPBr), 2,6-dichloro-2,4,4,6-tetramethylheptane; cumyl and aliphatic hydroxyls such as 1,4-di((2-hydroxyl-2-propyl)-benzene), 2,6-dihydroxyl-2,4,4,6-tetramethyl-heptane, 1-chloroadamantane and 1-chlorobornane, 5-tert-butyl-1,3-di(1-chloro-1-methyl ethyl)benzene and similar compounds. Other non-limiting examples of suitable initiators are cumyl esters of hydrocarbon acids, and alkyl cumyl ethers. Other suitable initiators may be found in U.S. Pat. No. 4,946,899, herein incorporated by reference for purposes of U.S. patent practice. These initiators are generally $C_5$ or greater tertiary or allylic alkyl or benzylic halides and may include polyfunctional initiators. Desirable examples of these initiators include: TMPCl, TMPBr, 2,6-dichloro-2,4,4,6-tetramethylheptane, cumyl chloride as well as 'di-' and 'tri-' cumyl chloride or bromide. In another embodiment, the initiator is a tertiary alkyl chloride-terminated polyisobutylene with a Mn (number average molecular weight) up to 2500.

In one embodiment, the TMPCl is made by dissolving isobutylene dimer in methylchloride and then adding anhydrous HCl to form the alkyl chloride. Excess HCl is then purged by nitrogen and the resulting solution of TMPCl in methylchloride is used as the initiator stream in a continuous plant to make butyl polymers. In one embodiment of the commercial-type process, the TMPCl stream is mixed with a cold methylchloride (chloromethane) stream and an aluminum alkyl stream to form the catalyst system. This stream is then injected into the continuous flow stirred tank reactor ("CFSTR") used to produce isobutylene-alkylstyrene polymers under much more controllable and economic conditions than has previously been possible.

The molar ratio of Lewis acid to initiator, applicable to all embodiments disclosed herein for the present invention is in the range of 1.5 moles Lewis acid per mole of initiator to 30 moles Lewis acid to mole of initiator. Alternatively for all embodiments, the molar ratio of Lewis Acid to initiator is in the range of 1.5 to 20 or in the range of 2 to 20.

Oxygenates/Ion Containing Species

Oxygenates and ion containing species may be added to the Lewis acid/initiator mixture if the Lewis acid is a stronger acid. These additives to the catalyst system include alcohols and ethers. When oxygenates are used they may be added to the polymerization medium by any stream in addition to the catalyst stream, including direct injection of the oxygenate by itself. A concentration range for the oxygenates is 15 to 0.5 wt ppm or less based on the reactor content, alternatively 8 to 1 ppm.

Preferred ion containing species include organic salts such as quaternary ammonium halides, quaternary phosphonium halides, oxonium ions and the like. Ion generating compounds may be used to increase the ionic strength of the polymerization medium. The ion generating compounds are typically tertiary organic halides that are not or are poorly effective at initiating the monomer feed. An example of ion generating compound is triphenylmethyl chloride.

Diluent

The selected diluent or diluent mixture should provide a diluent medium having some degree of polarity in order for the polymerization to proceed at a reasonable rate. To fulfill this requirement, a single polar diluent, a mixture of polar diluents, or a mixture of nonpolar and polar diluents can be used. To achieve suitable polarity and solubility, it has been found that if the diluent, or diluents, is mixed, the mixture is preferably at least 70% polar diluent, on a volume basis.

Suitable nonpolar diluent components include hydrocarbons and preferably aromatic or cyclic hydrocarbons or mixtures thereof. Such compounds include, for instance, methylcyclohexane, cyclohexane, toluene, carbon disulfide and others.

Appropriate polar diluents include chlorinated or fluorinated hydrocarbons, normal, branched chain or cyclic hydrocarbons. Specific chlorinated compounds include the liquid diluents such as ethyl chloride, methylene chloride (dichloromethane, $CH_2Cl_2$), methylchloride (chloromethane, $CH_3Cl$), $CHCl_3$, $CCl_4$, n-butyl chloride, chlorobenzene, and other chlorinated hydrocarbons. Methylchloride is desirably used in an embodiment of the invention.

Fluorinated hydrocarbons useful as polar diluents are hydrofluorocarbons ("HFC's" or "HFC") which are saturated or unsaturated compounds consisting essentially of hydrogen, carbon and fluorine, provided that at least one carbon, at least one hydrogen and at least one fluorine are present. In certain embodiments, the diluent comprises hydrofluorocarbons represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y and z are integers and at least one. Suitable HFC's are disclosed in U.S. Pat. No. 7,232,872.

When using a mixture of polar diluents, each diluent may be present in the polar diluent blend in amounts of 5 to 100 vol % based solely on the volume of the polar diluents, or 25 to 50 vol % based solely on the volume of the polar diluents.

Polymerization Reaction Conditions

As is normally the case, product molecular weights are determined by reaction time, temperature, concentration, the nature of the reactants, and similar factors. Consequently, different reaction conditions will produce products of different molecular weights. Synthesis of the desired reaction product will be achieved; therefore, through monitoring the course of the reaction by the examination of samples taken periodically during the reaction, a technique widely employed in the art and shown in the examples or by sampling the effluent of a continuous reactor.

The reactors that may be utilized in the practice of the present invention include any conventional reactors and equivalents thereof capable of performing a continuous slurry process, such as disclosed in U.S. Pat. No. 5,417,930, herein incorporated by reference. The reactor pump impeller can be of the up-pumping variety or the down-pumping variety. The reactor will contain sufficient amounts of the catalyst system of the present invention effective to catalyze the polymerization of the monomer containing feed-stream such that a sufficient amount of polymer having desired characteristics is produced. Such commercial reactors are differentiated from laboratory reactors which do not have either the volume capacity or the pumping/agitation ability.

The feed-stream in one embodiment contains a total monomer concentration greater than 30 wt % (based on the total weight of the monomers, diluent, and catalyst system), greater than 35 wt % in another embodiment. In yet another embodiment, the feed-stream will contain from 35 wt % to 50 wt % monomer concentration based on the total weight of monomer, diluent, and catalyst system.

The reaction conditions will be such that desirable temperature, pressure and residence time are effective to maintain the reaction medium in the liquid state and to produce the desired polymers having the desired characteristics. The monomer feed-stream is typically substantially free of any impurity which is adversely reactive with the catalyst under the polymerization conditions. For example, the monomer feed preferably should be substantially free of bases (such as caustic), sulfur-containing compounds (such as $H_2S$, COS, and organo-mercaptans, e.g., methyl mercaptan, ethyl mercaptan), N-containing compounds, oxygen containing bases such as alcohols and the like.

The polymerization reaction temperature is conveniently selected based on the target polymer molecular weight and the monomer to be polymerized as well as standard process variable and economic considerations, e.g., rate, temperature control, etc. The temperature for the polymerization is between −10° C. and the freezing point of the polymerization system in one embodiment, and from −25° C. to −120° C. in another embodiment. In yet another embodiment, the polymerization temperature is from −40° C. to −100° C., and from −70° C. to −100° C. in yet another embodiment. In yet another desirable embodiment, the temperature range is from −80° C. to −100° C. The temperature is chosen such that the desired polymer molecular weight is achieved. The reaction pressure will be from 200 kPa to 1600 kPa in one embodiment, from 300 kPa to 1200 kPa in another embodiment, and from 400 kPa to 1000 kPa in yet another embodiment.

The catalyst (Lewis Acid) to initiator ratio utilized will be those conventional in this art for carbocationic polymerization processes. In one embodiment of the invention, the catalyst to monomer mole ratios will be from 0.10 to 20, and in the range of 0.5 to 10 in another embodiment. In yet another desirable embodiment, the ratio of Lewis Acid to initiator is from 0.75 to 2.5, or from 1.25 to 1.5 in yet another desirable embodiment. The overall concentration of the initiator is from 50 to 300 ppm within the reactor in one embodiment, and from 100 to 250 ppm in another embodiment. The concentration of the initiator in the catalyst feed stream is from 500 to 3000 ppm in one embodiment, and from 1000 to 2500 in another embodiment. Another way to describe the amount of initiator in the reactor is by its amount relative to the polymer. In one embodiment, there is from 0.25 to 5.0 moles polymer/mole initiator, and from 0.5 to 3.0 mole polymer/mole initiator in another embodiment.

The reacted monomers within the reactor form the slurry. In one embodiment, the concentration of the slurry in a commercial reactor is equal to or greater than=22 wt %. In another embodiment, the slurry is present in the reactor in a concentration equal to or greater than 25 wt %. In yet another embodiment, the slurry concentration in the reactor is less than or equal to 50 wt %. In yet another embodiment, the slurry is present in the reactor from 22 to 40 wt %. And in yet another embodiment, the slurry concentration is present in the reactor from 25 to 35 wt %. In another embodiment, the slurry concentration is in the range of 25 to 28 wt %.

The order of contacting the monomer feed-stream, catalyst, initiator, and diluent is not critical to this invention. In one embodiment, the initiator and Lewis Acid are pre-complexed by mixing together in cold polar diluent or cold polar diluent blend, immediately before injection into the continuous reactor through a catalyst nozzle in the standard way. Other methods may also be employed that will inject the initiator into the reactor. Desirably, the monomer is not contacted with the Lewis Acid and initiator at the before entering the reactor.

In an embodiment of the invention, the initiator and Lewis Acid are allowed to pre-complex by mixing together in cold diluent at temperatures between −50° C. and −98° C. with a contact time between 0.5 seconds and several hours, and between 1 second and 5 minutes before injection into the reactor in another embodiment. In yet another embodiment, Lewis Acid and the initiator are added to the reactor separately.

In one embodiment, the polymerization of isobutylene and p-methylstyrene comprises several steps. First, a reactor having a pump impeller capable of up-pumping or down-pumping is provided. The pump impeller is typically driven by an electric motor with measurable amperage. The reactor typically is equipped with parallel vertical reaction tubes within a jacket containing liquid ethylene. The total internal volume, including the tubes, is greater than 30 to 50 liters, thus capable of large scale volume polymerization reactions. The reactor typically uses liquid ethylene to draw the heat of the polymerization reaction away from the forming slurry. The pump impeller keeps a constant flow of slurry, diluent, catalyst system and unreacted monomers through the reaction tubes. A feed-stream of the isobutylene and methylstyrene in a polar diluent is charged into the reactor. The catalyst system is then charged into the feed-stream, the catalyst system having a Lewis acid and an initiator present in a molar ratio of from 0.50 to 10.0. Within the commercial reactor, the feed-stream of monomers and catalyst system are allowed to contact one another, the reaction thus forming slurry of IPMS rubber, wherein the slurry has a concentration of from 22 wt % to 50 wt %. Finally, the thus formed polymer is allowed to exit the reactor through an outlet or outflow line while simultaneously allowing the feed-stream charging to continue, thus constituting the continuous slurry polymerization. Advantageously, the present invention improves this process in a number of ways, ultimately reducing the amount of clogging that occurs in the exit port which is measured by pressure inconsistencies or "jumps".

The overall residence time in the reactor can vary, depending upon, e.g., catalyst activity and concentration, monomer concentration, feed injection rate, production rate, reaction temperature, and desired molecular weight, and generally will be between about one minute and five hours, and preferably between about 10 and 60 minutes. The principle variable controlling residence time is the monomer feed injection rate. The resultant polymer from one embodiment of the invention is an isobutylene-para-methylstyrene polymer that has a molecular weight distribution of from about 2 to 5, and molecular weight of an exemplary viscosity average molecular weight in the range of from 200,000 up to 2,000,000. This product may be subjected to subsequent halogenation to afford a halogenated polymer.

EXAMPLES

This invention is described in context of the following experiments. Polymerizations were conducted in a laboratory-scale continuous reactor constructed of stainless steel and designed to permit the introduction of monomer and catalyst feeds as well as the continuous removal of the polymer product. Mixing was provided by a three-bladed impeller mounted on a stainless steel shaft and driven by an external electric motor. The motor was run at 1200 rpm to 1600 rpm. The reactor was equipped with a thermocouple to monitor the temperature of the reactor contents. The reactor was cooled to the desired reaction temperature by immersing the assemble reactor into a pentane or isohexane bath in an inert atmosphere glove box. The temperature of the stirred hydrocarbon bath was controlled to within 2 C. All apparatus in liquid contact with the reaction medium were dried at 120 C and cooled in a nitrogen atmosphere before use.

Isobutylene (available from Matheson Tri-Gas or Exxon-Mobil Chemical Company) and methyl chloride were dried by passing the gas through three stainless steel columns containing barium oxide and were condensed and collected as liquids in the glove box. 1,1,1,2-tetrafluoroethane (134a) was dried by passing the gas through three stainless steel columns contain 3 A molecular sieves and was condensed and collected as a liquid in a glove box. p-Methylsytrene was distilled prior to use. HCl solutions were prepared in either methyl chloride or 134a by dissolving gaseous HCl into the condensed liquid at low temperature. The concentration of the HCl in these prepared solutions was determined by standard titration techniques. In the examples below, the diluent composition referred to as the "blend" is a 50/50 wt mixture of 134a and methyl chloride.

The slurry copolymerizations were performed by first preparing the monomer and catalyst feeds. The monomer feed was prepared in a glass or metal reservoir and comprised isobutylene, p-methylstyrene, and the selected diluent. A catalyst feed was prepared for each copolymerization in a separate reservoir. The catalyst feed was prepared by adding a predetermined amount of the stock HCl solution and a hydrocarbon solution of the alkylaluminum halide. An initial monomer feed was also prepared and charged into the reactor for the purpose of starting the polymerization run. The concentration of monomer in this initial charge was 5 wt % isobutylene. p-Methylstyrene was also charged to this initial monomer feed at a wt % value comparable to the isobutylene/p-methylstyrene ratio in the feed blend. All feeds were chilled to the same temperature as the reactor using the chilled hydrocarbon bath of the glove box.

Polymerizations in the blend were conducted at a reactor temperature of about −75° C.±3° C., while polymerizations in methyl chloride were operated at −95° C.±3° C. Near the beginning of the polymerizations, the temperature of the bath was lowered a few degrees to provide an initial different in temperature between the bath and the reactor contents. The copolymerizations were begun by introducing the catalyst. The catalyst flow rate was controlled to provide for a constant differential temperature between the reactor and the bath to achieve the target polymerization temperature for the run. Optionally, the temperature of the bath was lowered to aid in achieving the polymerization temperature target. Addition of monomer feed from the reservoir was determined by the formation of precipitated polymer particles (slurry particles). The run was continued until the monomer feed in the reservoir was exhausted or until the desired amount of monomer feed was consumed. Generally, the average monomer conversion in these runs was better than 75% and at times as high as 99%.

Observations were made during the run regarding the quality of the slurry and its apparent viscosity. Once the reaction had achieved steady state, samples of the slurry were collected to determine slurry concentration and slurry particle composition. Slurry particle compositions could also be determined at the end of the run by sampling the slurry in the reactor.

Slurry particle compositions were determined by collecting slurry particles by vacuum filtration of the slurry. The filtration apparatus comprised a dynamic vacuum source, a cold trap to collect the separated diluent and a stainless steel sintered frit (porosity of 2 microns). The particles were collected by immersing the pre-chilled frit into the cold slurry. Once a ball of slurry particles formed around the frit, the frit was removed from the slurry while continuously removing diluent from between and around the slurry particles. Within a few seconds of removing the collected particles from the slurry and when diluent is no longer being extracted from the mass, samples of the particles are quickly transferred to determine the weight of the sample. The sample is warmed and dried in a vacuum oven to remove diluent from the polymer, and then weighed. The weight fraction of polymer in the isolated slurry particles is determined by comparing the initial weight of the collected "dry" slurry particles and the weight of the isolated and dried polymer using the following formula: weight fraction polymer in slurry particles=weight of oven dried polymer/weight of isolated slurry particles. The weight of the isolated slurry particles comprises the combined weight of the polymer and the occluded diluent.

Results for both inventive and comparative polymerizations are provided below in the Table.

TABLE

| Run | Diluent | Temp (° C.) | Catalyst system | Polymer to Initiator molar ratio | Steady-state slurry conc. (wt %) | Slurry Quality | Wt Fraction Polymer in Slurry Particles |
|---|---|---|---|---|---|---|---|
| 1 | 50/50 MeCl/134a | −75 | EADC/HCl | 4.7 | 20 | Thick, metastable, difficult to stir | 38 |
| 2 | 50/50 MeCl/134a | −75 | EADC/HCl | 3.5 | 16 | Fluid, stable | 38 |
| 3 | 50/50 MeCl/134a | −75 | EASC/HCl | 2.8 | 22 | Thick, metastable, difficult to stir | 55 |
| 4 | 50/50 MeCl/134a | −75 | EASC/HCl | 2.3 | 20 | Fluid, stable | 58 |

Runs 1 and 2 are comparative polymerization runs, with runs 3 and 4 being within the scope of the present invention. Multiple conclusions can be drawn from the data set forth in the Table. The slurry formed using the EASC/HCl catalyst system is fluid and stable at 20 wt % slurry concentrations, while at the same wt % slurry concentrations, when using the EADC/HCl catalyst system, the slurry is on the edge of instability. The change in slurry characteristics when using the EASC/HCl catalyst system permits operating the reactor at about a 25% increase in slurry concentration in comparison to when the EADC/HCl catalyst system is used. The improvements in slurry quality are consistent with the results of slurry particle composition analysis where the EASC/HCl catalyst system produced a particle containing more polymer and less diluent.

In relation to commercial reactors, which have a higher turbulence than can be replicated in the laboratory, a higher slurry concentration and weight fraction of polymer in the slurry particles would be expected. By way of comparison, for isobutylene/isoprene polymerization, commercial slurry concentrations are at or approaching 30 wt %, while laboratory polymerizations, using the same catalysts and polymerization medium, achieve a maximum operable slurry concentration of only 22 wt %, an approximate 25% decrease in slurry concentration for laboratory polymerizations. Thus, for the above laboratory polymerization runs 3 and 4, in a commercial reactor, stable slurry concentrations would be expected to be in the range of 25 to 28 wt %, a significant increase over the previously obtained 20 wt % in a commercial reactor. For the comparative laboratory polymerization runs 1 and 2, in a commercial reactor, stable slurry concentration would be expected to be in the range of 20 to less than 25 wt %. While a commercial comparative for Run 1 might approach a 25 wt % slurry concentration, the slurry is not stable and the polymer to initiator ratio is significantly higher than desired.

INDUSTRIAL APPLICABILITY

The resulting polymer of the present invention is a copolymer comprising a $C_4$ to $C_7$ isomonoolefins, such as isobutylene and an alkylstyrene comonomer, such as para-methylstyrene, containing at least 80%, more alternatively at least 90% by weight of the para-isomer. In any embodiment, the polymer may be a random elastomeric copolymer of ethylene or a $C_3$ to $C_6$ α-olefin and an alkylstyrene comonomer, such as para-methylstyrene containing at least 80%, alternatively at least 90% by weight of the para-isomer, wherein the randomness is defined by the incorporation characteristic of the alkylstyrene and the polymer is not a block copolymer. Exemplary materials may be characterized as polymers containing the following monomer units spaced along the polymer chain:

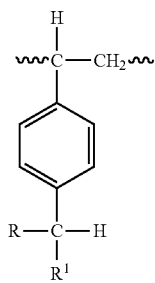

wherein R and $R^1$ are independently hydrogen, lower alkyl, such as a $C_1$ to $C_7$ alkyl and primary or secondary alkyl halides.

In certain embodiments, the random copolymers have a substantially homogeneous compositional distribution such that at least 95% by weight of the polymer has a para-alkylstyrene content within 10% of the average para-alkylstyrene content of the polymer. Exemplary polymers are characterized by a narrow molecular weight distribution (Mw/Mn) of less than 5, alternatively less than 2.5, an exemplary viscosity average molecular weight in the range of from 200,000 up to 2,000,000 and an exemplary number average molecular weight in the range of from 25,000 to 750,000 as determined by gel permeation chromatography.

The polymer may be functionalized or halogenated following polymerization. Halogenation can be carried out by any means, and the invention is not herein limited by the halogenation process. Methods of halogenating the disclosed polymers are disclosed in U.S. Pat. No. 5,670,582. The halogenated polymer has a Mooney Viscosity of from 20 to 70 (ML 1+8 at 125° C.) in one embodiment, and from 25 to 55 in another embodiment. The halogen wt % is from 0.1 to 10 wt % based in on the weight of the halogenated polymer in one embodiment, and from 0.5 to 5 wt % in another embodiment. In yet another embodiment, the halogen wt % of the halogenated polymer is from 1 to 2.5 wt %.

In one embodiment, brominated poly(isobutylene-co-p-methylstyrene) "BIMSM" polymers generally contain from 0.1 to 5% mole of bromomethylstyrene groups relative to the total amount of monomer derived units in the copolymer. In another embodiment, the amount of bromomethyl groups is from 0.2 to 3.0 mol %, and from 0.3 to 2.8 mol % in yet another embodiment, and from 0.4 to 2.5 mol % in yet another embodiment, and from 0.3 to 2.0 in yet another embodiment, wherein a desirable range may be any combination of any upper limit with any lower limit. Expressed another way, exemplary copolymers contain from 0.2 to 10 wt % of bromine, based on the weight of the polymer, from 0.4 to 6 wt % bromine in another embodiment, and from 0.6 to 5.6 wt % in another embodiment, are substantially free of ring halogen or halogen in the polymer backbone chain. In one embodiment, the random polymer is a copolymer of $C_4$ to $C_7$ isoolefin derived units (or isomonoolefin), para-methylstyrene derived units and para-(halomethylstyrene) derived units, wherein the para-(halomethylstyrene) units are present in the polymer from 0.4 to 3.0 mol % based on the total number of para-methylstyrene, and wherein the para-methylstyrene derived units are present from 3 to 15 wt % based on the total weight of the polymer in one embodiment, and from 4 to 10 wt % in another embodiment. In another embodiment, the para-(halomethylstyrene) is para-(bromomethylstyrene).

In certain embodiments, the IPAS or the halogenated IPAS may be blended with other elastomers or polymer in forming compounds. One such group of other elastomers are "general purpose rubbers."

A general purpose rubber, often referred to as a commodity rubber, may be any rubber that usually provides high strength and good abrasion along with low hysteresis and high resilience. These elastomers require antidegradants in the mixed compound because they generally have poor resistance to both heat and ozone.

Examples of general purpose rubbers include natural rubbers (NR), polyisoprene rubber (IR), poly(styrene-co-butadiene) rubber (SBR), polybutadiene rubber (BR), poly(isoprene-co-butadiene) rubber (IBR), and styrene-isoprene-butadiene rubber (SIBR), and mixtures thereof. Ethylene-propylene rubber (EPM) and ethylene-propylene-diene rubber (EPDM), and their mixtures, often are also referred to as general purpose elastomers.

In another embodiment, the composition may also comprise a natural rubber. Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D1646.

In another embodiment, the elastomeric composition may also comprise a polybutadiene (BR) rubber. The Mooney viscosity of the polybutadiene rubber as measured at 100° C. (ML 1+4) may range from 35 to 70, from 40 to about 65 in another embodiment, and from 45 to 60 in yet another embodiment. By "cis-polybutadiene" or "high cis-polybutadiene", it is meant that 1,4-cis polybutadiene is used, wherein the amount of cis component is at least 95%.

In another embodiment, the elastomeric composition may also comprise a polyisoprene (IR) rubber. The Mooney viscosity of the polyisoprene rubber as measured at 100° C. (ML 1+4) may range from 35 to 70, from 40 to about 65 in another embodiment, and from 45 to 60 in yet another embodiment.

In another embodiment, the elastomeric composition may also comprise rubbers of ethylene and propylene derived units such as EPM and EPDM as suitable additional rubbers. Examples of suitable comonomers in making EPDM are ethylidene norbornene, 1,4-hexadiene, dicyclopentadiene, as well as others. These rubbers are described in RUBBER TECHNOLOGY, P 260-283 (1995). A suitable ethylene-propylene rubber is commercially available as VISTALON™ (ExxonMobil Chemical Company, Houston, Tex.).

In yet another embodiment, the elastomeric composition may comprise a terpolymer of ethylene/alpha-olefin/diene terpolymer. The alpha-olefin is selected from the group consisting of $C_3$ to $C_{20}$ alpha-olefin with propylene, butene and octene preferred and propylene most preferred. The diene component is selected from the group consisting of $C_4$ to $C_{20}$ dienes. Examples of suitable dienes include straight chain, hydrocarbon diolefin or cycloalkenyl-substituted alkenes having from 6 to 15 carbon atoms. Specific examples include (a) straight chain acyclic dienes such as 1,4-hexadiene and 1,6-octadiene; (b) branched chain acyclic dienes such as 5-methyl-1,4-hexadiene; 3,7-dimethyl-1,6-octadiene; 3,7-dimethyl-1,7-octadiene; and the mixed isomers of dihydromyricene and dihydroocinene; (c) single ring alicyclic dienes, such as 1,3 cyclopentadiene; 1,4-cyclohexadiene; 1,5-cyclooctadiene and 1,5-cyclododecadiene; (d) multi-ring alicyclic fused and bridged ring dienes such as tetrahydroindene; methyl-tetrahydroindene; dicyclopentadiene (DCPD); bicyclo-(2.2.1)-hepta-2,5-diene; alkenyl, alkylidene, cycloalkenyl and cycloalkylidene norbornene, such as 5-methylene-2-norbornene (MNB), 5-propenyl-2-norbornene, 5-isopropylidene-2-norbornene, 5-ethylidene-2-norbornene (ENB), 5-(4-cyclopentenyl)-2-norbornene, 5-cyclohexylidene-2-norbornene, and 5-vinyl-2-norbornene (VNB); and (e) cycloalkenyl-substituted alkenes, such as allyl cyclohexene, vinyl cyclooctene, allyl cyclodecene, vinyl cyclododecene. Examples also include dicyclopentadiene, 1,4-hexadiene, 5-methylene-2-norbornene, and 5-ethylidene-2-norbornene. Examples of diolefins are 5-ethylidene-2-norbornene; 1,4-hexadiene, dicyclopentadiene and 5-vinyl-2-norbornene.

In another embodiment, the secondary elastomer is a specialty rubber containing a polar functional group such as butadiene-acrylonitrile rubber (NBR, or nitrile rubber), a copolymer of 2-propenenitrile and 1,3-butadiene. Nitrile rubber can have an acrylonitrile content of from 10 to 50 wt % in one embodiment, from 15 to 40 wt % in another embodiment, and from 18 to 35 wt % in yet another embodiment. The Mooney viscosity may range from 30 to 90 in one embodiment (1+4, 100° C., ASTM D1646), and from 30 to 75 in another embodiment.

In another embodiment, the secondary elastomer is a derivative of NBR such as hydrogenated or carboxylated or styrenated nitrile rubbers. Butadiene-acrylonitrile-styrene rubber (SNBR, or "ABS" rubber), a copolymer of 2-propenenitrile, 1,3-butadiene and styrene, can have an acrylonitrile content of from 10 to 40 wt % in one embodiment, from 15 to 30 wt % in another embodiment, and from 18 to 30 wt % in yet another embodiment. The styrene content of the SNBR copolymer may range from 15 wt % to 40 wt % in one embodiment, and from 18 wt % to 30 wt % in another embodiment, and from 20 to 25 wt % in yet another embodiment. The Mooney viscosity may range from 30 to 60 in one embodiment (1+4, 100° C., ASTM D1646), and from 30 to 55 in another embodiment. These rubbers are common in the art.

In yet another embodiment, the secondary elastomer is a specialty rubber containing a halogen group such as polychloroprene (CR, or chloroprene rubber), a homopolymer of 2-chloro-1,3-butadiene. The Mooney viscosity may range from 30 to 110 in one embodiment (1+4, 100° C., ASTM D1646), and from 35 to 75 in another embodiment. These rubbers are common in the art.

The elastomeric compositions may two or more elastomers. The elastomer(s) may also be combined with other materials or polymers.

In another embodiment, instead of blending the IPAS polymer with a secondary elastomer, the IPAS polymer and halogenated IPAS polymers may be blended with a thermoplastic resin to form a dynamically vulcanized alloy. As used herein, the term "thermoplastic resin" means a material which generally softens, or melts, when exposed to high temperatures and returns to its original condition when cooled to a lower, or room temperature. A thermoplastic resin is distinct from a thermoset or elastomeric material which solidifies via cross-linking or curing when subjected to heat. Suitable thermoplastic resins include, but are not limited to, polyamides, polyesters, polycarbonates, polysulfones, polyacetals, polyacetones, acrylonitrile-butadiene styrene resins, polyphenylene oxides, polyphenylene sulfides, styrene-acrylonitrile resins, styrene-maleic anhydrides resins, aromatic polyketones, and ethylene vinyl alcohol resins. Suitable thermoplastic resins are further disclosed in U.S. Pat. No. 5,453,465 and U.S. Pat. No. 6,907,911.

The elastomeric compositions comprising the IPAS or halogenated IPAS may also include a variety of other components and may be optionally cured to form cured elastomeric compositions that ultimately are fabricated into end use articles.

For example, the elastomeric compositions may optionally comprise:
  a) at least one filler, for example, calcium carbonate, clay, mica, silica, silicates, talc, titanium dioxide, starch, wood flour, carbon black, or mixtures thereof;
  b) at least one inorganic nanoclay, for example, montmorillonite, nontronite, beidellite, volkonskoite, laponite, hectorite, saponite, sauconite, magadite, kenyaite, stevensite, vermiculite, halloysite, aluminate oxides, hydrotalcite, or mixtures thereof, optionally, treated with modifying agents to form organic nanoclays;
  c) at least one processing oil, for example, aromatic oil, naphthenic oil, paraffinic oil, or mixtures thereof;
  d) at least one processing aid, for example, plastomer, polybutene, polyalphaolefin oils, or mixtures thereof;
  e) at least one cure package or curative or wherein the composition has undergone at least one process to produce a cured composition, for example zinc oxide, zinc stearate, stearic acid, sulfur, or mixtures thereof; or
  f) any combination of a-e.

The elastomeric compositions may be extruded, compression molded, blow molded, injection molded, and laminated into various shaped articles including fibers, films, laminates, layers, industrial parts such as automotive parts, appliance housings, consumer products, packaging, and the like.

In particular, the elastomeric compositions are useful in articles for a variety of tire applications such as truck tires, bus tires, automobile tires, motorcycle tires, off-road tires, aircraft tires, and the like. The elastomeric compositions may either be fabricated into a finished article or a component of a finished article such as an innerliner for a tire. The article may be selected from air barriers, air membranes, films, layers (microlayers and/or multilayers), innerliners, innertubes, sidewalls, treads, bladders, and the like.

In another application, the elastomeric compositions may be employed in air cushions, pneumatic springs, air bellows, hoses, accumulator bags, and belts such as conveyor belts or automotive belts.

They are useful in molded rubber parts and find wide applications in automobile suspension bumpers, auto exhaust hangers, and body mounts.

Additionally, the elastomeric compositions may also be used as adhesives, caulks, sealants, and glazing compounds. They are also useful as plasticizers in rubber formulations; as components to compositions that are manufactured into stretch-wrap films; as dispersants for lubricants; and in potting and electrical cable filling materials.

In yet other applications, the elastomer(s) or elastomeric compositions of the invention are also useful in chewing-gum, as well as in medical applications such as pharmaceutical stoppers and closures, coatings for medical devices, and the arts for paint rollers.

The present disclosure thus provided for the following embodiments:

A. A polymerization method for preparing polymers derived from $C_4$ to $C_7$ isoolefin monomers and alkyl-styrene monomers, the method comprising: a) providing feed streams into a reactor, the feed streams comprising the isoolefin, alkyl-styrene monomers, a polar diluent or polar diluent mixture, and a catalyst system, and b) allowing the feed streams to contact one another within the reactor so that the monomers form a polymer in a stable slurry, wherein the amount of polymer in the slurry yields a slurry concentration greater than 22 wt %;

B. A polymerization method for preparing polymers derived from $C_4$ to $C_7$ isoolefin monomers and alkyl-styrene monomers, the method comprising: a) providing feed streams into a reactor, the feed streams comprising the isoolefin, alkyl-styrene monomers, a polar diluent or polar diluent mixture, and a catalyst system comprising a Lewis acid and an initiator and b) allowing the feed streams to contact one another within the reactor so that the monomers form a polymer in a stable slurry, wherein the ratio of moles of polymer formed per mole initiator is in the range of 0.25 to 4.0 moles polymer per mole of initiator;

C. The polymerization method of embodiment A or B, wherein the slurry has a slurry concentration is in the range of 25 to 35 wt %;

D. The polymerization method of embodiment A or B, wherein the slurry has a slurry concentration is equal to or greater than 25 wt %;

E. The polymerization method of embodiment A or B, wherein the slurry concentration is in the range of 22 to 40 wt %;

F. The polymerization method of any one of embodiments A to E, or any combination of embodiments A to E, wherein the ratio of moles of polymer formed per mole of initiator is not more than 4 moles of polymer per one mole of initiator;

G. The polymerization method of any one of embodiments A to F, or any combination of embodiments A to F, wherein the ratio of moles of polymer formed per mole of initiator is in the range of 0.25 to 4.0 moles polymer per one mole of initiator;

H. The polymerization method of any one of embodiments A to G, or any combination of embodiments A to G, wherein the catalyst system is comprised of a Lewis acid and an initiator;

I. The polymerization method of embodiment H, wherein Lewis acid is a Group 13 Lewis acid having the formula $R_nMX_{3-n}$, wherein M is a Group 13 metal, R is a monovalent hydrocarbon radical selected from the group consisting of $C_1$ to $C_{12}$ alkyl, aryl, arylalkyl, alkylaryl and cycloalkyl radicals; and n is an integer from 0 to 3; and X is a halogen independently selected from the group consisting of fluorine, chlorine, bromine, and iodine;

J. The polymerization method of embodiment H, wherein the Lewis acid is ethyl aluminum sesquichloride, aluminum bromide, boron trichloride, diethylaluminum chloride, dimethylaluminum chloride, and diisobutylaluminum chloride, or mixtures thereof;

K. The polymerization method of embodiment H, wherein the initiator is HCl, water, or has the formula:

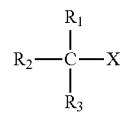

wherein X is a halogen; $R_1$ is selected from the group consisting of $C_1$ to $C_8$ alkyl, and $C_2$ to $C_8$ alkenyl; $R_3$ is selected from the group consisting of, $C_1$ to $C_8$ alkyl, $C_2$ to $C_8$ alkenyl and phenylalkyl; and $R_2$ is selected from the group consisting of $C_4$ to $C_2$-$C_{10}$ alkyl, $C_2$ to $C_8$ alkenyl, phenyl, phenylalkyl, alkylphenyl, $C_3$ to $C_{10}$ cycloalkyl, and

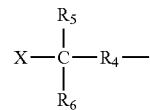

wherein X is a halogen; $R_5$ is selected from the group consisting of, $C_1$ to $C_8$ alkyl, and $C_2$ to $C_8$ alkenyl; $R_6$ is selected from the group consisting of, $C_1$ to $C_8$ alkyl, $C_2$ to $C_8$ alkenyl and phenylalkyl; and $R_4$ is selected from the group consisting of phenylene, biphenyl, $\alpha,\omega$-diphenylalkane and —$(CH_2)_n$—, wherein n is an integer from 1 to 10; and wherein $R_1$, $R_2$, and $R_3$ can also form adamantyl or bornyl ring systems, the X group being in a tertiary carbon position;

L. The polymerization method of any one of embodiments A to K, or any combination of embodiments A to K, wherein an oxygenate or ion containing species is provided into the reactor;

M. The polymerization method of embodiment L, wherein the oxygenate is an alcohol or an ester;

N. The polymerization method of any one of embodiments A to M, or any combination of embodiments A to M, wherein the isoolefin monomer is isobutylene, isobutene, 2-methyl-1-butene, 3-methyl-1-butene, 2-methyl-2-butene, 1-butene, 2-butene, methyl vinyl ether, indene, vinyltrimethylsilane, hexene, or 4-methyl-1-pentene;

O. The polymerization method of any one of embodiments A to N, or any combination of embodiments A to N, wherein the alkyl substitution of the alkyl-styrene is a $C_1$ to $C_7$ alkyl;

P. The polymerization method of any one of embodiments A to O, or any combination of embodiments A to O, wherein an additional monomer may be present in the feed stream for polymerization with the isoolefin and the alkylstyrene, the additional monomer being a $C_4$ to $C_{14}$ multiolefin;

Q. The polymerization method of any one of embodiments A to P, or any combination of embodiments A to P, wherein the polar diluent mixture is a mixture of at least two polar diluents or a mixture of at least 70 vol % polar diluents and nonpolar diluent;
R. An isoolefin-alkylstyrene polymer manufactured by the method of any one of embodiments A to Q, or any combination of embodiments A to Q;
S. The polymer of embodiment R, wherein the polymer may also contain $C_4$ to $C_{14}$ multiolefin derived units;
T. The polymer of embodiment R or S, wherein the polymer is blend to form a composition, the composition may comprise:
  a) at least one filler selected from calcium carbonate, clay, mica, silica, silicates, talc, titanium dioxide, starch, wood flour, carbon black, or mixtures thereof;
  b) at least one inorganic nanoclay or organic nanoclays;
  c) at least one processing oil;
  d) at least one processing aid selected from plastomer, polybutene, polyalphaolefin oils, or mixtures thereof;
  e) at least one curative;
  f) a secondary elastomer;
  g) a thermoplastic resin; or
  h) any combination of a-g;
U. The polymer of any one of embodiments R to T, or any combination of embodiments R to T, wherein the composition may be used in a tire innerliner, a tire bladder, a curing bladder, a hose, a conveyor belt, or a pharmaceutical stopper.

What is claimed is:

1. A polymerization method for preparing polymers derived from $C_4$ to $C_7$ isoolefin monomers and alkyl-styrene monomers, the method comprising:
  a) providing feed streams into a reactor, the feed streams comprising the isoolefin, alkyl-styrene monomers, a diluent comprising methylchloride and optionally 5 to 50 vol % of at least one hydrofluorocarbon and/or a nonpolar diluent, and a catalyst system wherein the catalyst system is selected from either i) a weak Lewis acid with an HCl initiator or ii) a strong Lewis acid, an initiator and either an oxygenate or an ion containing species; and
  b) allowing the feed streams to continuously contact one another within the reactor so that the monomers form a polymer in a reaction mixture, creating a slurry of polymer and reaction mixture, wherein the amount of polymer in the slurry yields a slurry concentration greater than 22 wt %,
  wherein the ratio of moles of polymer produced per mole of initiator is not more than 4 moles of polymer per one mole of initiator.

2. The polymerization method of claim 1, wherein the slurry concentration is in the range of 25 to 35 wt %.

3. The polymerization method of claim 1, wherein the slurry concentration is equal to or greater than 25 wt %.

4. The polymerization method of claim 1, wherein the slurry concentration is in the range of 22 to 40 wt %.

5. The polymerization method of claim 1, wherein the weak Lewis acid is ethyl aluminum sesquichloride, aluminum bromide, boron trichloride, diethylaluminum chloride, dimethylaluminum chloride, and diisobutylaluminum chloride, or mixtures thereof, and the strong Lewis acid is ethyl aluminum dichloride or diethylaluminum chloride or mixtures thereof.

6. The polymerization method of claim 1, wherein the initiator is HCl, water, or has the formula:

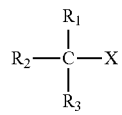

wherein X is a halogen; $R_1$ is selected from the group consisting of $C_1$ to $C_8$ alkyl, and $C_2$ to $C_8$ alkenyl; $R_3$ is selected from the group consisting of, $C_1$ to $C_8$ alkyl, $C_2$ to $C_8$ alkenyl and phenylalkyl; and $R_2$ is selected from the group consisting of $C_4$ to $C_{200}$ alkyl, $C_2$ to $C_8$ alkenyl, phenyl, phenylalkyl, alkylphenyl, $C_3$ to $C_{10}$ cycloalkyl, and

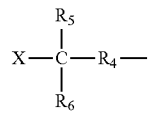

wherein X is a halogen; $R_5$ is selected from the group consisting of, $C_1$ to $C_8$ alkyl, and $C_2$ to $C_8$ alkenyl; $R_6$ is selected from the group consisting of, $C_1$ to $C_8$ alkyl, $C_2$ to $C_8$ alkenyl and phenylalkyl; and $R_4$ is selected from the group consisting of phenylene, biphenyl, $\alpha,\omega$-diphenylalkane and $-(CH_2)_n-$, wherein n is an integer from 1 to 10; and wherein $R_1$, $R_2$, and $R_3$ can also form adamantyl or bornyl ring systems, the X group being in a tertiary carbon position.

7. The polymerization method of claim 1, wherein the ratio of moles of polymer formed per mole of initiator is in the range of 0.25 to 4.0 moles polymer per one mole of initiator.

8. The polymerization method of claim 1, wherein the ion containing species is an organic salt selected from quaternary ammonium halides, quaternary phosphonium halides, oxonium ions, and tertiary organic halides.

9. The polymerization method of claim 1, wherein the oxygenate is an alcohol or an ester.

10. The polymerization method of claim 1, wherein the isoolefin monomer is isobutylene, isobutene, 2-methyl-1-butene, 3-methyl-1-butene, 2-methyl-2-butene, 1-butene, 2-butene, methyl vinyl ether, indene, vinyltrimethylsilane, hexene, or 4-methyl-1-pentene.

11. The polymerization method of claim 1, wherein the alkyl substitution of the alkyl-styrene is a $C_1$ to $C_7$ alkyl.

12. The polymerization method of claim 1, wherein an additional monomer may be present in the feed stream for polymerization with the isoolefin and the alkylstyrene, the additional monomer being a $C_4$ to $C_{14}$ multiolefin.

13. The polymerization method of claim 1, wherein the monomer conversion rate is greater than 75%.

* * * * *